United States Patent [19]

Carrano

[11] Patent Number: 5,183,008
[45] Date of Patent: Feb. 2, 1993

[54] LIVESTOCK SORTING SYSTEM HAVING IDENTIFICATION SENSOR AND GATE MOUNTED EXIT SWITCH

[75] Inventor: James A. Carrano, Stoughton, Wis.

[73] Assignee: DEC International, Inc., Madison, Wis.

[21] Appl. No.: 653,762

[22] Filed: Feb. 11, 1991

[51] Int. Cl.⁵ ............................................. A01K 29/00
[52] U.S. Cl. ..................................... 119/155; 119/159
[58] Field of Search ................... 119/155, 51.02, 14.03, 119/159, 20, 98

[56] References Cited

U.S. PATENT DOCUMENTS

| | | |
|---|---|---|
| 1,899,320 | 2/1933 | Dupuy . |
| 3,128,744 | 4/1964 | Jefferts et al. . |
| 3,844,273 | 10/1974 | Polson ............................ 119/51.02 |
| 3,949,709 | 4/1976 | Myers ................................. 119/159 |
| 4,000,718 | 1/1977 | Brown ............................. 119/14.03 |
| 4,114,151 | 9/1978 | Denne et al. . |
| 4,274,083 | 6/1981 | Tomoeda ........................ 119/51.02 |
| 4,463,353 | 7/1984 | Kuzara . |
| 4,798,175 | 1/1989 | Townsend et al. ................. 119/155 |

FOREIGN PATENT DOCUMENTS

| | | | |
|---|---|---|---|
| 3702465 | 11/1988 | Fed. Rep. of Germany . | |
| 8704898 | 8/1987 | PCT Int'l Appl. ................. | 119/155 |
| 2053343 | 2/1981 | United Kingdom ................ | 119/155 |

OTHER PUBLICATIONS

"BML-Modellvochaben: Abruffutterung fur Zuchtsauen", Kirchner, *Landtechnik*, vol. 43, No. 5, May 1, 1988, Darmstadt (D.E.), pp. 232-234.

"Abruffuttering fur Sauen", Berkner, *Landtechnik*, vol. 43, No. 5, May 1, 1988, Darmstadt (DE), pp. 223-231.

*Primary Examiner*—John J. Wilson
*Assistant Examiner*—Todd E. Manahan
*Attorney, Agent, or Firm*—Andrus, Sceales, Starke & Sawall

[57] ABSTRACT

A livestock sorting system (10) is provided with an entrance (11) having an identification sensor (13-15) for identifying designated livestock passing therethrough, and first and second aisles (18, 20) extending from the entrance. A gate (52) has a first position (FIG. 2) providing communication of the entrance with the first aisle, and a second position (FIG. 3) providing communication of the entrance with the second aisle. An automatic control actuates the gate between the first and second positions in response to the identification sensor.

13 Claims, 3 Drawing Sheets

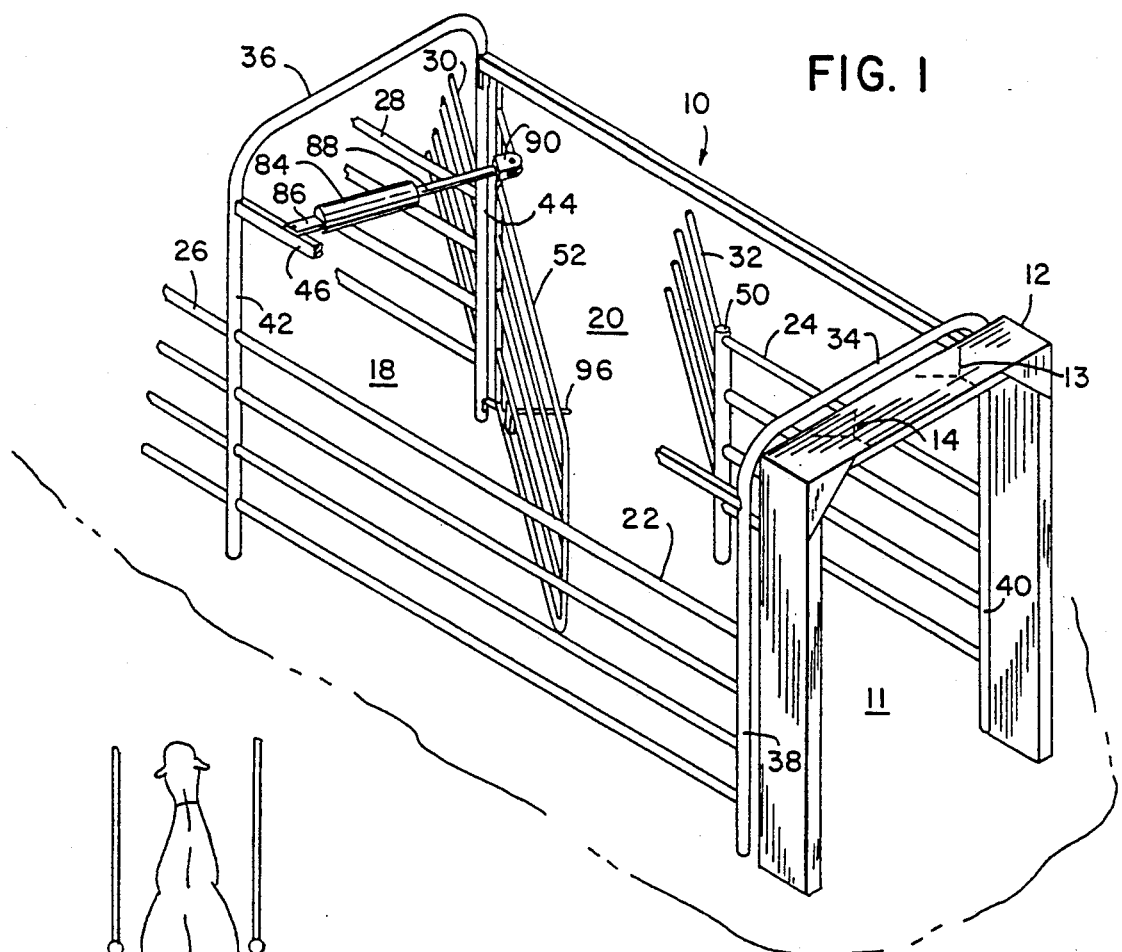
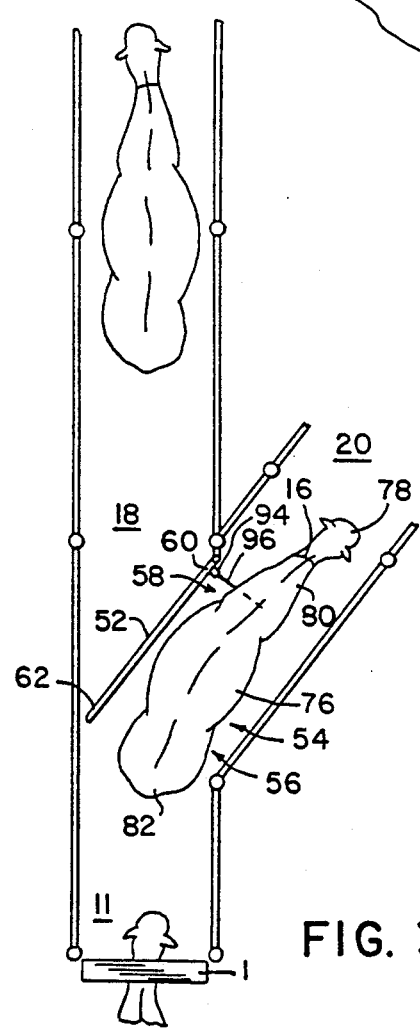
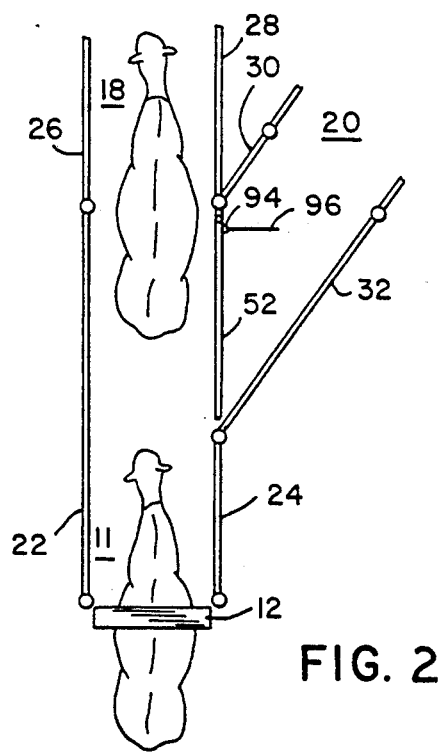

LIVESTOCK SORTING SYSTEM HAVING IDENTIFICATION SENSOR AND GATE MOUNTED EXIT SWITCH

BACKGROUND AND SUMMARY

The invention relates to livestock handling systems, and more particularly to automated sorting systems for herd management and the like.

The invention arose during continuing development efforts directed toward sorting systems for a dairy farm or the like. It is desired to sort cows or other animals which have been identified for particular attention, monitoring, feeding, medical attention, etc.

BRIEF DESCRIPTION OF THE DRAWINGS

FIG. 1 shows a livestock sorting system in accordance with the invention.

FIG. 2 is a top schematic view of the system of FIG. 1, and shows a first gate position.

FIG. 3 is like FIG. 2 and shows a second gate position.

DETAILED DESCRIPTION

Figure 7:
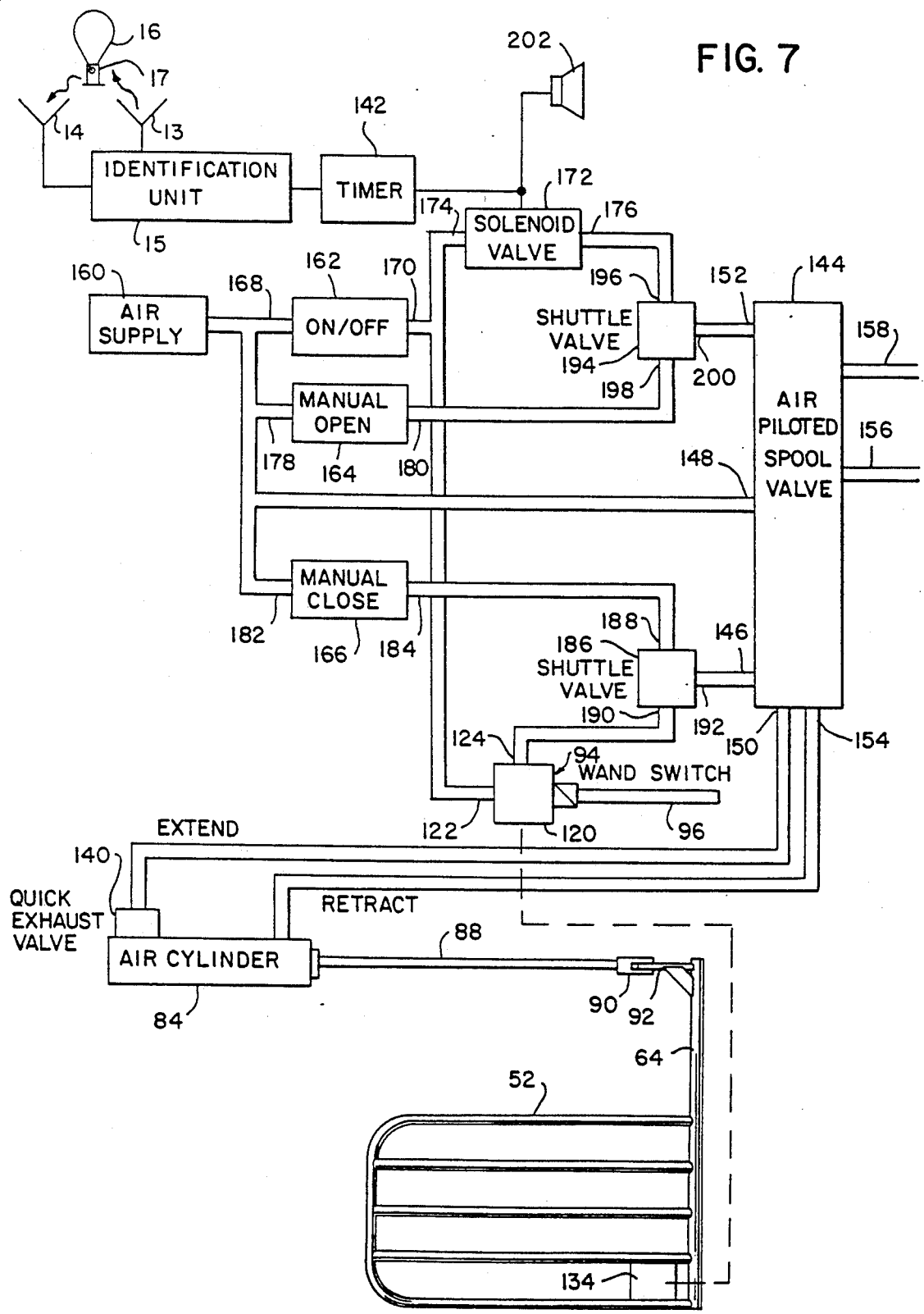
FIG. 7 is a schematic electrical and pneumatic circuit diagram.

FIG. 1 shows a livestock sorting system 10 having an entrance 11 at frame 12 having an identification sensor including a transmitter antenna 13 and a receiver antenna 14 for an identification unit 15, FIG. 7, for identifying designated livestock passing through the entrance. The livestock animal has a collar 16 carrying an identifying tag 17 including an electronic oscillator circuit triggered by interrogating electromagnetic RF radiation from antenna 13 and sending back a coded identifying signal in response to the interrogating pulse. Such identification systems are known in the prior art for example as shown in U.S. Pat. Nos. 4,463,353 and 4,114,151, incorporated herein by reference. The preferred identification sensor is that disclosed in copending application Ser. No. 07/452,538, filed Dec. 18, 1989. If the electronic identity tag 17 carried by the animal has a sort code assigned thereto, identification unit 15 generates an on state output signal which causes gate 52 to pivot clockwise to the position in FIG. 3 to sort the animal to aisle 20, to be described. If the electronic identity tag 17 carried by the animal does not have a sort code assigned thereto or otherwise has a pass-through code assigned thereto, then identification unit 15 does not generate an on state output signal, and gate 52 remains in the position shown in FIG. 2, such that the animal passes through to aisle 18, and is not sorted to aisle 20, to be described.

Aisles 18 and 20 extend from entrance 11, FIG. 1-3. The entrance has left and right siderails 22 and 24, aisle 18 has left and right siderails 26 and 28, and aisle 20 has left and right siderails 30 and 32. Opposing siderails are connected by overhead cross bars such as 34 and 36 which have vertical sides extending downwardly to provide support posts as at 38, 40, 42, 44. The cross bars are connected by overhead parallel rails 46 and 48 for added support. Right siderails 24 and 32 are joined and supported at support post 50 which has a reduced height relative to support posts 38, 40, 42, 44.

Figure 4:
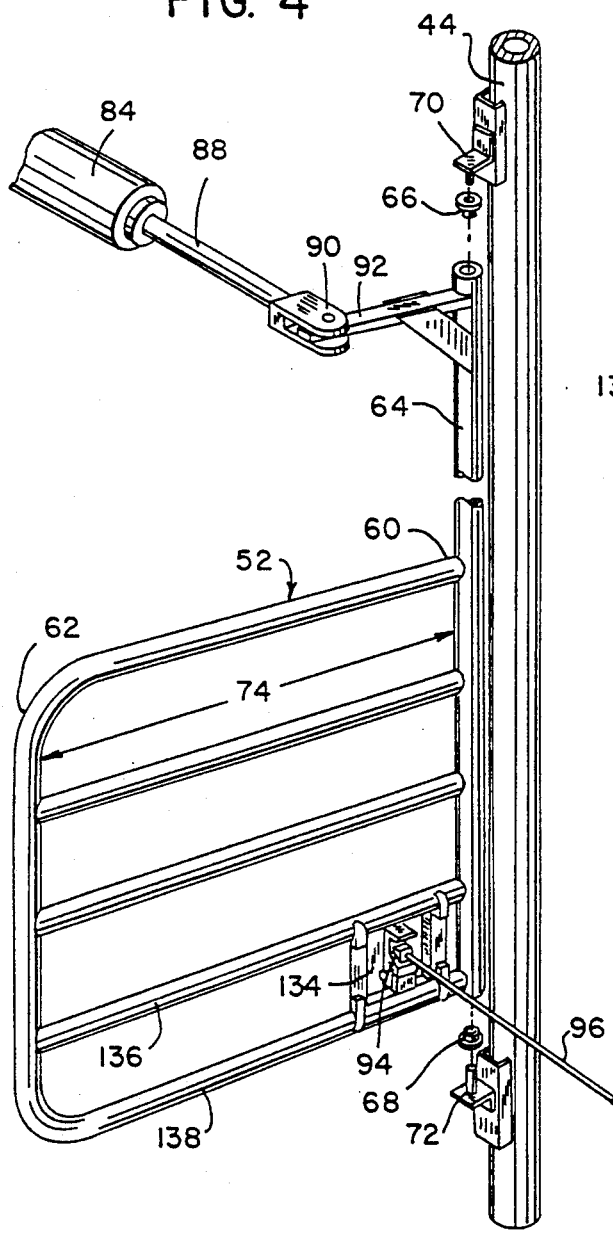
FIG. 4 is an enlarged perspective view of a portion of FIG. 1.

A gate 52 has a first position as shown in FIG. 2 providing communication of entrance 11 with aisle 18, and blocking communication of entrance 11 with aisle 20. Gate 52 has a second position as shown in FIG. 3 providing communication of entrance 11 with aisle 20, and blocking communication of entrance 11 with aisle 18. Aisles 18 and 20 converge at a junction 54, FIG. 3, having an upstream end 56 and a downstream end 58. Gate 52 is a pivoted member having a hinged downstream end 60 pivoting on a vertical axis at downstream end 58 of junction 54. Gate 52 has an upstream end 62 swingable in an arc across upstream end 56 of junction 54. Gate 52 includes a vertical tube 64, FIG. 4, at the noted hinged downstream end which is mounted to post 44 by upper and lower bearings 66 and 68 on upper and lower respective brackets 70 and 72. Gate 52 has a length 74 from swingable upstream end 62 to hinged downstream end 60 substantially the same as the length of the livestock animal's body 76, FIG. 3, excluding head 78 and neck 80, such that the rear 82 of the livestock animal is about even with swingable upstream end 62 of gate 52 as the gate swings from the position in FIG. 3 to the position in FIG. 2.

Air cylinder 84 provides an actuator actuating gate 52 between the noted first and second positions of FIGS. 2 and 3, in response to the identification sensor. Cylinder 84 is mounted at bracket 86 to upper rail 46. The cylinder has an extensible and retractable plunger 88 connected at bracket 90, FIG. 4, to arm 92 extending from vertical tube 64 of gate 52. The air cylinder is at an elevated location above the travel path of livestock passing therebelow. Air cylinder 84 actuates gate 52 to the position shown in FIG. 3 in response to identified designated livestock passing through entrance 12. An exit switch 94 in aisle 20 responds to livestock passing through aisle 20, and triggers air cylinder 84 to actuate gate 52 from the FIG. 3 position to the FIG. 2 position.

Figure 5:
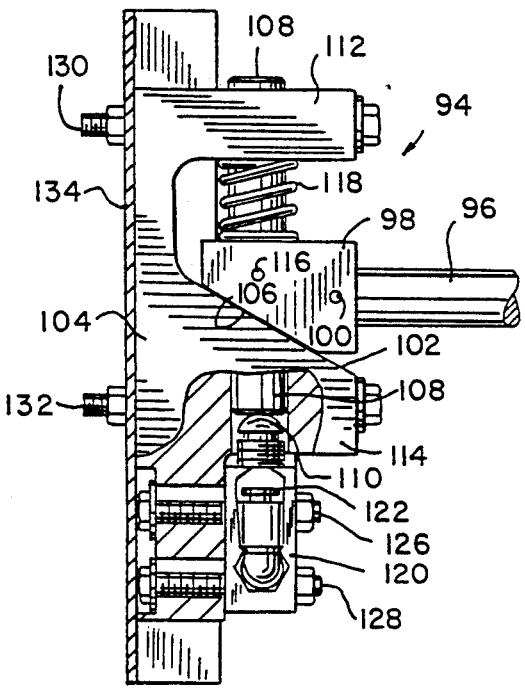
FIG. 5 is an enlarged side view, partly in section, of a portion of FIG. 4.
Figure 6:
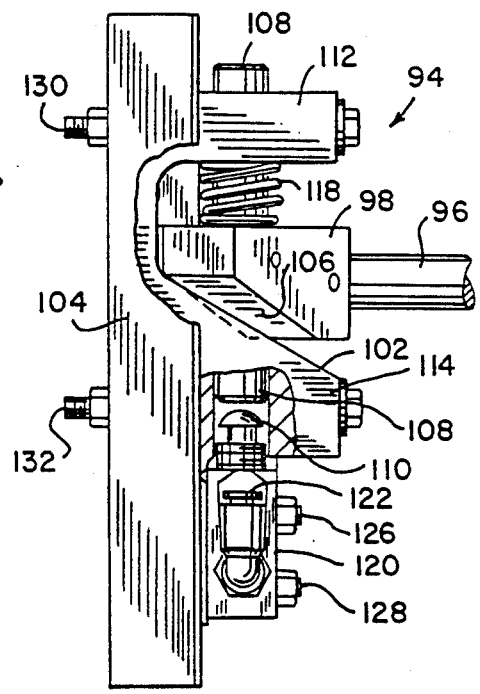
FIG. 6 is like FIG. 5 and shows another position.

Exit switch 94 is mounted to gate 52. Exit switch 94 is provided by a wand switch having a trip wand 96 extending into aisle 20 and engaged and tripped by livestock passing therethrough. The wand switch is mounted to gate 52 at the hinged downstream end 60 of the gate and at a low location such that the livestock animal's legs engage trip wand 96. The wand switch is known in the prior art and will be only briefly described. Trip wand 96 is a semi-rigid yet flexible rod such as nylon which will bend enough to prevent harming the animal's legs and yet is stiff enough to rotate an actuator block 98, FIGS. 5 and 6, when the animal's legs engage and move trip wand 96. Trip wand 96 extends from block 98 and is secured in a bore therein by a driven roll pin 100. When trip wand 96 is moved forwardly in FIG. 3 by the animal's legs, which is into the page in FIG. 5, block 98 rotates and is cammed by slanted camming surface 102 of support block 104 engaging the slanted underside 106 of actuator block 98, such that rod 108 moves upwardly, FIG. 6, allowing plunger 110 to move upwardly, to provide a pneumatic air control function, to be described. Rod 108 rotates in trunnion portions 112, 114 of support block 104. Rod 108 extends through actuator block 98, and block 98 is non-rotatably secured to rod 108 by a driven roll pin 116. Block 98 is normally biased to a centered downward position by spring 118 such that plunger 110 is normally in a downward position, FIG. 5. When trip wand 96 is moved by the legs of a livestock animal, actuator block 98 is rotated and rides upwardly on camming surface 102 to move rod 108 upwardly against the bias of spring 118 and enable plunger 110 to move upwardly. Plunger 110 is the plunger of a Humphrey Model No. 31P pneumatic valve 120. When plunger 110 is allowed to move upwardly, valve 120 is in an open condition and allows pressurized air to pass from input port 122 to an output port on the other side of the valve, not shown in FIG. 5, but schematically shown at 124 in FIG. 7. Valve 120 is mounted to support block 104 by bolts 126, 128. Support block 104 is mounted by bolts 130, 132 to plate 134 which is clamped to lower cross rails 136, 138 of gate 52.

A differential speed mechanism 140, FIG. 7, moves gate 52 from the FIG. 2 position to the FIG. 3 position faster than return movement of the gate from the FIG. 3 position to the FIG. 2 position, such that gate 52 moves fast enough to the FIG. 3 position to divert even fast moving livestock to aisle 20, and such that the slower return movement of the gate back to the FIG. 2 position allows the livestock sufficient time to pass into aisle 20 without harm. The slower movement of gate 52 to the FIG. 2 position gently nudges and completes movement of slower moving livestock into aisle 20. Air cylinder plunger 88 is movable in a first direction, rightwardly in FIGS. 1-4, actuating gate 52 to the FIG. 2 position, and is movable in a second direction, leftwardly in FIGS. 1-4, actuating gate 52 to the FIG. 3 position. The differential speed mechanism 140 is a quick discharge valve provided by a Humphrey Model No. SQE2 valve providing faster movement of plunger 88 in the leftward retraction direction than in the rightward extension direction.

An on-cycle timer 142, FIG. 7, responds to the identification sensor when identified designated livestock passes through entrance 11 and provides an on state signal to the actuator to actuate gate 52 to the FIG. 3 position, and holds such signal in the on state for a given duration. Timer 142 is preferably an RC timing circuit, though other timers may be used, such as counters counting oscillator clock pulses, or the like. Exit switch 94 provides an off state signal to the actuator to actuate gate 52 to the FIG. 2 position when livestock passes through aisle 20 and trips wand 96 of exit switch 94.

An air piloted spool valve 144, FIG. 7, provided by an Asco Model No. 54100754 valve, responds to on-cycle timer 142 and to exit switch 94. If both on and off state signals are present, valve 144 overrides the off state signal from exit switch 94 in favor of the on state signal from timer 142, such that valve 144 is controlled by the on state signal and outputs the on state signal to actuator 84. Hence, if an identified designated livestock animal trips exit switch 94 during an on state signal caused by an immediately trailing identified designated livestock animal having passed through entrance 11, then gate 52 will remain in the FIG. 3 position, and not move to the FIG. 2 position, whereby to enable two or more successive designated livestock animals to be sorted out and diverted to aisle 20. Valve 144 has a first condition responsive to pressurized air at its input 146 and supplying air from input 148 to output 150 which is connected to air cylinder 84 to actuate plunger 88 to extend rightwardly to the FIG. 2 position. Valve 144 has a second condition responsive to pressurized air at its input 152, and supplying air from input 148 to output 154 which is connected to air cylinder 84 to actuate plunger 88 to retract leftwardly to the FIG. 3 position. When both inputs 146 and 152 are supplied with air pressure, valve 144 is actuated to the latter noted condition such that pressurized air is supplied from input 148 to output 154 to retract plunger 88 leftwardly to the FIG. 3 position. Outputs 156 and 158 are exhaust ports for respective inputs 146 and 152.

The system of FIG. 7 includes a pressurized air supply 160, a first manually operated pneumatic valve 162, provided by a Telemecanique Model No. ZB2BJ4 valve providing an "on/off" valve, a second manually operated pneumatic valve 164, provided by a Telemecanique PZBB1911 valve providing a "manual open" valve, and a third manually operated pneumatic valve 166, provided by a Telemecanique PXBB1911 valve providing a "manual close" valve. Valve 162 has an input 168 connected to air supply 160, and an output 170 connected to valve 120 of wand switch 94 and to an electrically actuated pneumatic solenoid valve 172, provided by an Asco Model No. UX83-80A2 valve. Solenoid valve 172 has an air input 174 and an air output 176. Output 170 of valve 162 is connected to inputs 122 and 174. When wand 96 is moved forwardly by the livestock animal in FIG. 3, rod 108, FIG. 6, moves upwardly, and plunger 110 is allowed to move upwardly, which in turn passes the pressurized air from input 122, FIG. 7, to output 124. When an identified designated livestock animal passes through entrance 11, i.e. that animal's identity tag 17 has a sort code assigned thereto, sensor identification unit 15 triggers timer 142 which in turn provides an on state signal to solenoid valve 172 which in turn passes the pressurized air signal at input 174, FIG. 7, to output 176. Valve 164 has an input 178 connected to air supply 160, and an output 180. Valve 166 has an input 182 connected to air supply 160, and an output 184.

A shuttle valve 186, provided by an ADI Model No. 060501 valve, has a first input 188 from output 184 of valve 166, a second input 190 from output 124 of valve 120 of exit switch 94, and an output 192 supplied to input 146 of valve 144. Another shuttle valve 194, also provided by an ADI Model No. 060501 valve, has a first input 196 from output 176 of valve 172, a second input 198 from output 180 of valve 164, and an output 200 supplied to input 152 of valve 144. Each shuttle valve responds to pressurized air at either of its inputs, and supplies such pressurized air to its output. This enables gate 52 to be actuated to open or closed positions by the operator. To open gate 52 to the FIG. 3 position, the operator manually actuates valve 164 to an open condition to supply pressurized air from input 178 to output 180 which in turn supplies pressurized air to shuttle valve input 198 which in turn supplies pressurized air to shuttle valve output 200 and input 152 of air piloted spool valve 144 which in turn is actuated to supply pressurized air from input 148 to output 154 which in turn supplies the pressurized air to air cylinder 84 to retract plunger 88 leftwardly to move gate 52 to the FIG. 3 position. Valve 164 enables the operator to selectively sort a livestock animal to aisle 20 even if the electronic identification tag carried by that animal is not assigned a sort code or otherwise does not send back a coded identifying signal. If the operator sees an animal he wishes sorted to aisle 20 that was not previously assigned a sort code, he can manually open valve 164 to cause gate 52 to pivot to the FIG. 3 position.

To actuate gate 52 to the closed position of FIG. 2, the operator manually actuates valve 166 to an open condition to supply pressurized air from input 182 to output 184 which in turn supplies pressurized air to shuttle valve input 188 which in turn supplies the pressurized air to shuttle valve output 192 and input 146 of air piloted spool valve 144 which in turn is actuated to supply pressurized air from input 148 to output 150 which in turn is supplied to air cylinder 84 to extend plunger 88 rightwardly to move gate 52 to the closed position shown in FIG. 2.

In the preferred embodiment, the on state signal from timer 142 is also provided to a sound source or beeper 202 to provide an audible indication to the operator that gate 52 is being moved to the FIG. 3 position and a livestock animal is being sorted to aisle 20.

It is recognized that various equivalents, alternatives and modifications are possible within the scope of the appended claims.

I claim:

1. A livestock sorting system comprising:
   an entrance having an identification sensor for identifying designated livestock passing therethrough;
   a first aisle extending from said entrance;
   a second aisle extending from said entrance, said first and second aisles converging at a junction having an upstream end and a downstream end;
   a gate having a first position providing communication of said entrance with said first aisle and blocking communication of said entrance with said second aisle, and having a second position providing communication of said entrance with said second aisle and blocking communication of said entrance with said first aisle, said gate being a pivoted member having a hinged downstream end pivoting on a vertical axis at said downstream end of said junction, said gate having an upstream end swingable in an arc across said upstream end of said junction;
   an actuator actuating said gate between said first and second positions;
   an automatic control for automatically controlling actuation of said gate by said actuator between said first and second positions in response to said identification sensor, said actuator actuating said gate to said second position in response to identified designated livestock passing through said entrance;
   an exit switch in said second aisle and responsive to livestock passing through said second aisle to trigger said actuator to actuate said gate from said second position to said first position, said exit switch being spaced downstream from said swingagble upstream end of said gate by a given distance such that the rear of the livestock animal is about even with said swingable upstream end of said gate as said gate swings from said second position to said first position,
   wherein said exit switch is mounted to said gate at a location spaced downstream from said swingable upstream end of said gate by a distance substantially the same as the length of the livestock animal's body, excluding head and neck.

2. The invention according to claim 1 wherein said exit switch comprises a wand switch mounted to said gate and having a trip wand extending into said second aisle and engaged and tripped by livestock passing therethrough.

3. The invention according to claim 2 wherein said wand switch is mounted to said gate at said hinged downstream end of said gate.

4. The invention according to claim 3 wherein said gate has a length from said swingable upstream end to said hinged downstream end substantially the same as the length of the livestock animal's body, excluding head and neck, such that the rear of the livestock animal is about even with said swingable upstream end of said gate as said gate swings from said second position to said first position.

5. The invention according to claim 2 wherein said wand switch is mounted to said gate at a low location such that the livestock animal's legs engage said trip wand.

6. A livestock sorting system comprising:
   an entrance having an identification sensor for identifying designated livestock passing therethrough;
   a first aisle extending from said entrance;
   a second aisle extending from said entrance;
   a gate having a first position providing communication of said entrance with said first aisle and blocking communication of said entrance with said second aisle, and having a second position providing communication of said entrance with said second aisle and blocking communication of said entrance with said first aisle;
   an actuator actuating said gate between said first and second positions;
   an automatic control for automatically controlling actuation of said gate by said actuator between said first and second positions in response to said identification sensor;
   a differential speed mechanism moving said gate from said first position to said second position faster than return movement of said gate from said second position to said first position, such that said gate moves fast enough to said second position to divert even fast moving livestock to said second aisle, and such that the slower return movement of said gate back to said first position allows the livestock sufficient time to pass into said second aisle without harm, and wherein said slower movement of said gate to said first position gently nudges and completes the movement of slower moving livestock into said second aisle.

7. The invention according to claim 6 wherein said actuator comprises an air cylinder having a plunger movable in a first direction actuating said gate to said first position, and movable in a second direction actuating said gate to said second position, and wherein said differential speed mechanism comprises a quick discharge valve providing faster movement of said plunger in said second direction than in said first direction.

8. A livestock sorting system comprising:
   an entrance having an identification sensor for identifying designated livestock passing therethrough;
   a first aisle extending from said entrance;
   a second aisle extending from said entrance;
   a gate having a first position providing communication of said entrance with said first aisle and blocking communication of said entrance with said second aisle, and having a second position providing communication of said entrance with said second aisle and blocking communication of said entrance with said first aisle;
   an actuator actuating said gate between said first and second positions;
   an on-cycle timer responsive to said identification sensor when identified designated livestock passes through said entrance and providing an on state signal to said actuator to actuate said gate to said second position and holding said signal in said on state for a given duration;

an exit switch responsive to livestock passing through said second aisle and providing an off state signal to said actuator to actuate said gate to said first position;

override means responsive to both said on-cycle timer and said exit switch and overriding said off state signal in favor of said on state signal, such that when both said off state and on state signals are present, said override means is controlled by said on state signal and outputs said on state signal to said actuator, such that if an identified designated livestock animal trips said exit switch during an on state signal caused by an immediately trailing identified designated livestock animal having passed through said entrance, then said gate will remain in said second position, and not move to said first position, whereby to enable two or more successive designated livestock animals to be sorted out and diverted to said second aisle.

9. The invention according to claim 8 wherein said actuator comprises an air cylinder having a plunger movable in a first direction actuating said gate to said first position, and movable in a second direction actuating said gate to said second position, and said override means comprises an air piloted spool valve having a first condition actuating said plunger in said first direction, and a second condition actuating said plunger in said second direction, and having a first input from said exit switch for actuating said valve to said first condition, and a second input from said on-cycle timer for actuating said valve to said second condition, said valve being actuated to said second condition when both of said inputs are actuated.

10. A livestock sorting system comprising:
an entrance having an identification sensor for identifying designated livestock passing therethrough;
a first aisle extending from said entrance;
a second aisle extending from said entrance;
a gate having a first position providing communication of said entrance with said first aisle and blocking communication of said entrance with said second aisle, and having a second position providing communication of said entrance with said second aisle and blocking communication of said entrance with said first aisle;
an air cylinder having a plunger movable in a first direction actuating said gate to said first position, and movable in a second direction actuating said gate to said second position;
an air piloted spool valve having a first input controlling a first output supplying air to said air cylinder to actuate said plunger in said first direction, and having a second input controlling a second output supplying air to said air cylinder to actuate said plunger in said second direction;
an air supply supplying air to said air piloted spool valve;
a pneumatic solenoid valve responsive to said identification sensor and supplying air from said air supply to said second input of said air piloted spool valve in response to identified designated livestock passing through said entrance;
a pneumatic exit switch responsive to livestock passing through said second aisle and supplying air from said air supply to said first input of said air piloted spool valve.

11. The invention according to claim 10 comprising:
a first manually operated pneumatic valve having an input connected to said air supply and an output connected to said solenoid valve and to said exit switch;
a second manually operated pneumatic valve having an input connected to said air supply and having an output;
a third manually operated pneumatic valve having an input connected to said air supply and having an output;
a first pneumatic shuttle valve having a first input from said solenoid valve, a second input from said output of said second manually operated pneumatic valve, and an output connected to said second input of said air piloted spool valve, such that the operator may supply air from said air supply through said second manually operated pneumatic valve and through said first shuttle valve to said second input of said air piloted spool valve, regardless of the condition of said solenoid valve, whereby said second output of said air piloted spool valve actuates said plunger in said air cylinder to move in said second direction actuating said gate to said second position;
a second pneumatic shuttle valve having a first input from said exit switch, a second input from said output of said third manually operated pneumatic valve, and an output connected to said first input of said air piloted spool valve, such that the operator may supply air from said air supply through said third manually operated pneumatic valve and through said second shuttle valve to said first input of said air piloted spool valve, regardless of the condition of said exit switch, whereby said first output of said air piloted spool valve actuates said plunger in said air cylinder to move in said first direction actuating said gate to said first position.

12. The invention according to claim 10 comprising an on-cycle timer responsive to said identification sensor when identified designated livestock passes through said entrance and providing an on state signal to said solenoid valve to supply air from said air supply through said solenoid valve to said second input of said air piloted spool valve such that said second output of said air piloted spool valve actuates said plunger in said air cylinder in said second direction actuating said gate to said second position, and holding said signal in said on state for a given duration such that an on state air signal is present at said second input of said air piloted spool valve for said given duration, and wherein said exit switch provides an off state air signal at said first input of said air piloted spool valve in response to livestock passing through said second aisle, and wherein said air piloted spool valve responds to air signals at both of its said first and second inputs by overriding said off state air signal in favor of said on state air signal, such that when both said off state and on state air signals are present, said air piloted spool valve is controlled by said on state air signal, and said second output of said air piloted spool valve actuates said plunger in said air cylinder to move in said second direction to actuate said gate to said second position, such that if an identified designated livestock animal trips said exit switch during an on state air signal caused by an immediately trailing identified designated livestock animal having passed through said entrance, then said gate will remain in said second position, and not move to said first position, whereby to enable two or more successive designated livestock animals to be sorted out and diverted to said second aisle.

13. The invention according to claim 10 wherein said first output of said air piloted spool valve is connected through a pneumatic quick discharge valve to said air cylinder, and provides faster air flow in one direction than in the opposite direction, to provide faster movement of said plunger in said second direction than in said first direction.

* * * * *